(12) United States Patent
Soman

(10) Patent No.: US 9,478,231 B1
(45) Date of Patent: Oct. 25, 2016

(54) MICROPHONE INTERFACE AND IP CORE FOR ALWAYS-ON SYSTEM

(71) Applicant: Cadence Design Systems, Inc., San Jose, CA (US)

(72) Inventor: Manoj Shridhar Soman, Pune (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 58 days.

(21) Appl. No.: 14/643,234

(22) Filed: Mar. 10, 2015

(51) Int. Cl.
*H04B 15/00* (2006.01)
*G10L 21/0208* (2013.01)

(52) U.S. Cl.
CPC .................................. *G10L 21/0208* (2013.01)

(58) Field of Classification Search
CPC .............. H04R 2201/401; H04R 2203/12; H04R 2205/022; H04R 2225/39; H04R 2225/51; H04R 2227/005; H04R 2420/07; H04R 2430/01; H04R 25/554; H04R 25/70; H04R 29/008; H04R 3/00; H04R 5/04; H04R 9/043; G10L 19/012; G10L 19/06; G11B 27/11; G11B 27/28
USPC .......... 381/56–58, 92, 94.1–94.4, 71.1–71.6, 381/71.11–71.14; 700/94; 375/219
See application file for complete search history.

(56) References Cited

U.S. PATENT DOCUMENTS

| | | | | |
|---|---|---|---|---|
| 9,111,047 B1* | 8/2015 | Shridhar | ................. | G06F 13/40 |
| 2009/0052677 A1* | 2/2009 | Smith | ....................... | H04S 7/40 |
| | | | | 381/56 |
| 2013/0028301 A1* | 1/2013 | Sashittal | ................ | G06F 13/00 |
| | | | | 375/219 |
| 2013/0129103 A1* | 5/2013 | Donaldson | ............ | G10K 11/16 |
| | | | | 381/71.1 |
| 2014/0270284 A1* | 9/2014 | Luna | ..................... | H04R 27/00 |
| | | | | 381/303 |

\* cited by examiner

*Primary Examiner* — Lun-See Lao
(74) *Attorney, Agent, or Firm* — Kenyon & Kenyon LLP

(57) ABSTRACT

Methods and systems provide a partitioned IP core and hierarchical power management to reduce power consumption and footprint size of an "always-on" pulse density modulation (PDM) sensor system. The IP core may be partitioned into a register transfer level (RTL) block and a firmware block. The RTL may include a first stage decimation filter, storage, and, optionally, a sound energy detector. The firmware block may include subsequent decimation filter(s) and sensor processing logic, e.g., a sound trigger algorithm. In operation, the firmware block may conserve energy by being in a power-off or power-saving mode by default. Responsive to a trigger by the sound energy detector, the firmware block may wake up, receive data from the RTL block, and process the data. The sound energy detector may output the trigger based on characteristics of the received sample such as signal strength, noise strength, and type.

25 Claims, 5 Drawing Sheets

100

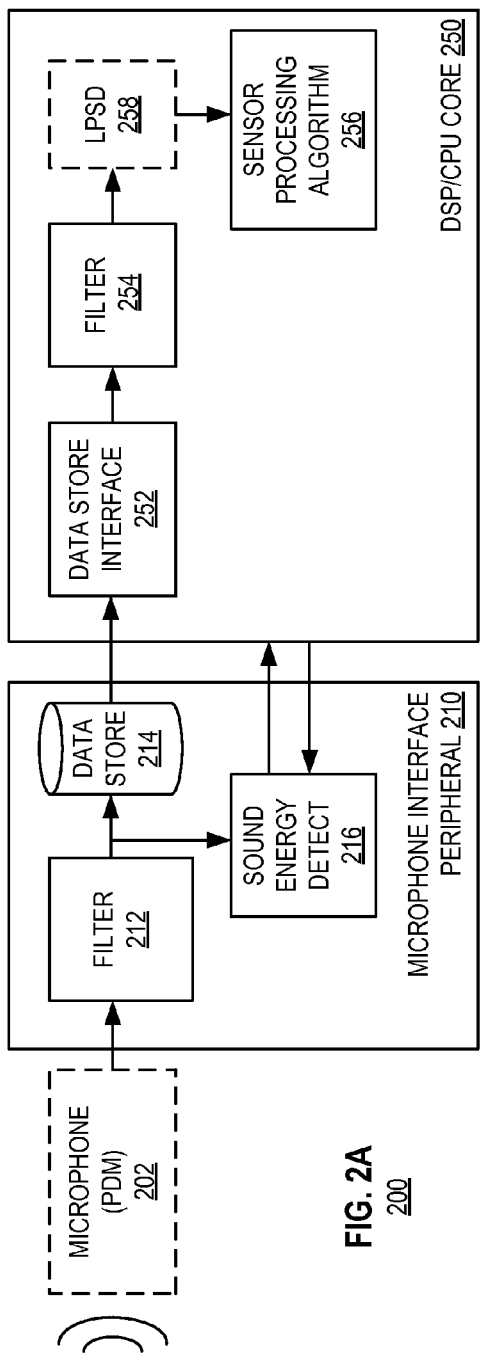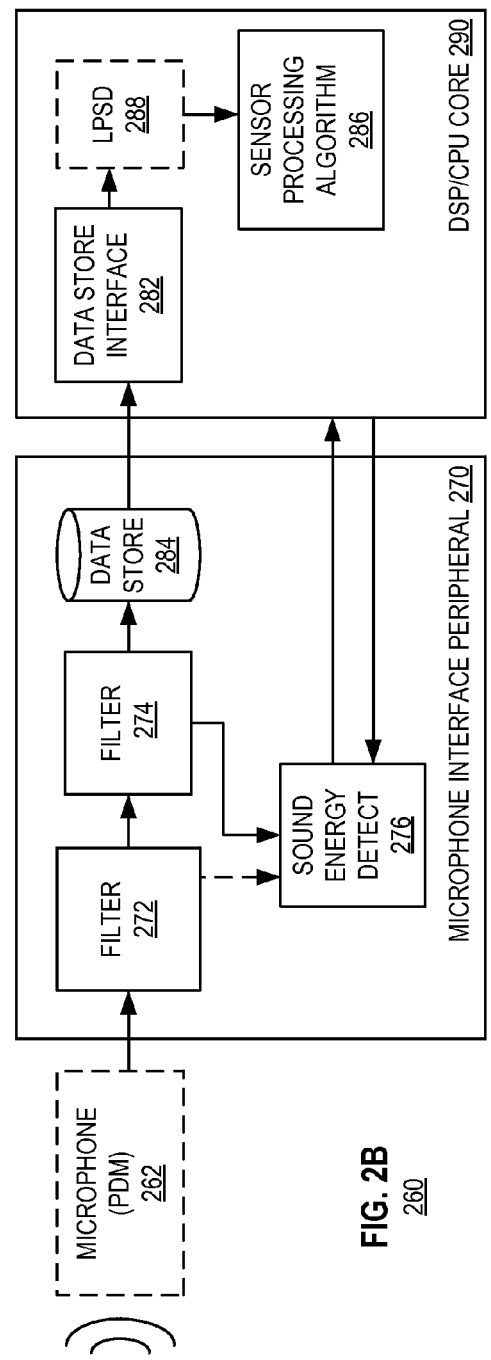

300

400

600

500

MICROPHONE INTERFACE AND IP CORE FOR ALWAYS-ON SYSTEM

FIELD OF THE DISCLOSURE

The present disclosure relates to a method and system for audio processing and in one aspect, to voice processing. More specifically, it relates to a semiconductor intellectual property core (IP core) including an interface and processing for a pulse density modulation (PDM) microphone, which microphone may be "always-listening," also referred to as "always-on".

BACKGROUND

Mobile electronic devices including sensing devices for use in the Internet of Things (IoT) typically contain sensors such as microphones. For functionalities such as voice-triggering, the sensor device is "always-on" to continuously process incoming data and detect triggers such as a voice command or other audio stimuli. The always-on nature of the sensors and accompanied processing is power intensive and negatively impacts battery life and the consumption of electricity. One example of a sensor device for always-on applications is a PDM microphone. A PDM microphone generates a one-bit oversampled data stream. Thus, processing of a PDM output typically includes decimation, which reduces a sampling rate of a signal. The decimation may be implemented by one or more stages and/or filters to generate an output at a Nyquist sampling rate. There exists a need in the art to more efficiently manage power consumption of an "always-on" system such as a voice recognition system with a PDM microphone.

BRIEF DESCRIPTION OF THE DRAWINGS

FIG. 2A is a simplified block diagram of a system according to an embodiment.

FIG. 2B is a simplified block diagram of a system according to an embodiment.

DETAILED DESCRIPTION

Figure 1:
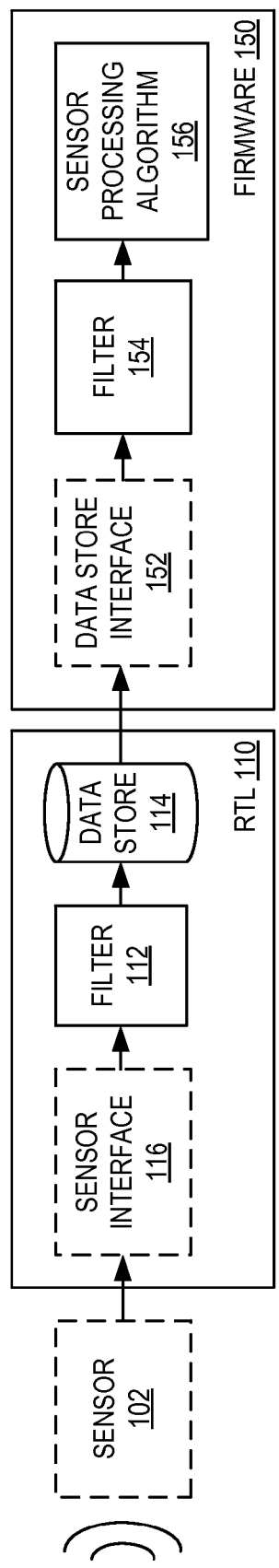
FIG. 1 is a simplified block diagram of a system according to an embodiment.

Typically "always-on" systems with sensor devices process captured signals on firmware running on a digital signal processor (DSP), a processing unit such as a central processing unit (CPU), or the like ("DSP/CPU" for simplicity). For a PDM microphone, the processing may include decimation, sound detection, and voice command decoding. By performing all of the processing functions with the firmware block of the DSP/CPU, the system may suffer from inefficient power management, high power consumption, inefficient use of processing resources, and inflexibility. In particular, high power consumption may result from constant processing by a decimation filter and implementing a full decision filtering in firmware; inflexibility may result from an inefficient interface for the sensor device, e.g., oversampled PDM microphone data and an inability to dynamically configure an IP core for a tradeoff between power and/or millions of cycles per second (MCPS) dissipation and sound quality.

Methods and systems of the present disclosure provide hierarchical power management and partitioning of an IP core to improve the performance of "always-on" systems. The partitioning of the filtering and processing according to the methods discussed herein allows for an additional level of power management in hardware and effects a reduction in power and physical layout area consumed, compared with conventional methods for operating a PDM system.

In an embodiment, hierarchical power management may reduce power consumption. In an embodiment, an IP core may be partitioned into a register transfer level (RTL) block and a firmware block. Some functions typically performed by the firmware may be allocated to the RTL block instead. The hierarchical power management may be performed at two levels: first, at the RTL block, and secondly, at the firmware block. The partitioned architecture may be more power efficient than other architectures. In an embodiment, a signal flow may allow for a low power decimation filter to be implemented as a combination of front-end filter stages in RTL and back end filter stages in firmware in a DSP. In another embodiment, the RTL may include a sound energy detection (SED) module. The RTL portion, including a low power consuming filter and, optionally the SED, may be "always-on," while the firmware portion is generally off. The RTL portion may alert the firmware portion according to methods discussed herein. In this manner, the back-end filters in the firmware portion may provide an illusion of being always-on without being active until triggered by the SED of the RTL block. In other words, the DSP may be off by default, and may wake up in response to an alert by the RTL block. Such a hierarchical power management methods and systems may allow for the average system power consumption to be significantly reduced. In another embodiment, one or more back-end filters may be provided in the RTL block. The SED may be coupled to one or more back-end filters.

In an embodiment, the firmware components may be programmable to provide flexibility. For example, the firmware may have one or more of the following programmable features: sampling rates, oversampling ratios and sound quality. For example, the sound quality may be specified at a precision e.g., 16 bit/24 bit precision at different signal-to-noise ratios (SNRs), which may provide support for different types of digital PDM microphones. As another example, the firmware may be dynamically configurable to provide a desired MCPS/power vs. sound record quality tradeoff. The tradeoff may be dynamically configured according to an application scenario. For instance, the architecture may allow the firmware to become "context aware" by using an optional SED. SED parameters may identify and adapt the system to different scenarios. In an embodiment, the SED may differentiate between scenarios such as a noisy public place, night time, babble, etc.

FIG. 1 is a simplified block diagram of a system 100 according to an embodiment. The system may include an RTL block 110 and a firmware block 150. Each of RTL block 110 and firmware block 150 may be operated according to the methods described herein. For example, the RTL block and the firmware block may perform one or more of the methods shown by way of example in FIG. 3.

The RTL block may include a filter 112 and a data store 114. The filter 112 may be implemented by a decimation filter, which reduces a sample rate of a signal. The filter may be advantageously provided in the RTL block to provide power savings, as described herein. The filter may run at a relatively high oversample rate (compared with subsequent filter(s)). The filter may have a multiplier-less structure. The filter may provide relatively high decimation, which produces output at a relatively lower sample rate to simplify or facilitate subsequent processing by the firmware block 150. In an embodiment, the filter 112 may include a cascaded-integrator comb (CIC) filter. In an embodiment, the filter 112 includes a filter with multiple stages. In another embodiment, the filter 112 includes at least one filter. The filter 112 may include at least one decimation stage. The decimation stage(s) may be implemented by any combination of finite impulse response (FIR) and half-band filters, or any other combination of filters as understood by one of ordinary skill in the art. The filter 112 may output at least one sample, also referred to as a "frame."

The data store 114 may store frames output by the filter 112. In an embodiment, the data store may save frames for later distribution to the firmware block 150. In another embodiment, the data store may pass frames immediately to the firmware block 150. By way of non-limiting example, the data store 114 may be implemented by or include a storage apparatus for storing data such as in a first-in-first-out (FIFO) manner. The data store 114 may process, store, and output data in a format compatible with the firmware block 150. For example, if the filter 112 is implemented by a CIC decimator or variant and the firmware block receives blocks of sample data in a pre-definable format, then the data store may receive the CIC filter output, which output may be generated uniformly over time. The data store may then output data to the firmware block 150 in bursts as desired by the firmware block 150. Alternatively, the data store may be implemented by any storage apparatus understood by one of ordinary skill in the art.

The firmware block 150 may include a filter 154 and a sensor processing algorithm 156. The filter 154 may process received data including decimation, volume control, and/or offset removal. In an embodiment, the filter 154 includes a filter with multiple stages. In another embodiment, the filter 154 includes at least one filter. The filter 154 may include at least one decimation stage. The decimation stage(s) may be implemented by any combination of finite impulse response (FIR) and half-band filters, or any other combination of filters as understood by one of ordinary skill in the art.

The sensor processing algorithm 156 may include a detection algorithm and/or a trigger algorithm. For example, the sensor processing algorithm may include voice detection and/or voice trigger functions. The sensor processing algorithm may analyze an audio sample (also referred to as a "sound sample") to determine corresponding functions. For example, an audio sample may trigger a function.

In an embodiment, the firmware block 150 may include a data store interface 152. The data store interface may be compatible with the data store 114. The data store interface may process a queue or other storage apparatus to condition an input to the filter 154. The data store interface may be customizable. The data store interface may be instantiated for multiprocessor communication. For example, the firmware block 150 may be configured to receive data in chunks, while the filter 112 outputs data as a steady stream. The data store 114 may store the output of the filter 112, then output the data to the data store interface 152. The data store interface 152 may then output the data in chunks recognizable by the filter 154.

In an embodiment, the RTL block 110 may include a sensor interface 116. The sensor interface may be compatible with the sensor 102. The sensor interface may include logic for receiving output for the sensor and outputting the sensor data to the filter 112.

In operation, the filter 112 may receive a sample from sensor 102. Using the example of a sound sample output by a PDM microphone, the input to the filter 112 may be an oversampled one-bit data stream. In an embodiment, the sample rate may be progressively reduced by the filter 112 and the filter 154. For example, the filter 112 may be a first stage decimator that reduces the sample rate of the data stream by several orders. By way of non-limiting example, the filter 112 may reduce the sample rate by around 8 times to around 32 times. The first stage decimator may be implemented by a CIC decimator or variant. The filter 112 may remove noise from the data stream and further condition the data stream for subsequent processing by the firmware block 150. The output of the filter 112 may be stored in data store 114. The data store 114 may interface with data store interface 152.

The data stream may be passed from the RTL block 110 to the firmware block 150 via the data store 114 and data store interface 152. For example, the firmware block 150 may be configured to receive data in chunks (or bursts), while the filter 112 outputs data as a steady stream. The data store 114 may store the output of the filter 112. When desired by the firmware block 150, the data store 114 may output the data to the data store interface 152. The data store interface 152 may then output bursts of data to the filter 154. The filter 154 may include one or more decimation stages to further reduce a sample rate of the data stream. In an embodiment, the filter 154 may reduce the sampling rate by around two times to around eight times. The output of the filter 154 may be a data stream at a sampling rate suitable for the sensor processing algorithm 156, e.g., a Nyquist sampling rate. The sensor processing algorithm may then operate on the data stream to perform processing functions. For example, the sensor processing algorithm may detect an audio stimulus such as a voice command. As another example, the sensor processing algorithm may determine information about an environment in which the audio stream is generated.

FIG. 2A is a simplified block diagram of a system 200 according to an embodiment. The system may include a microphone interface peripheral 210 and a DSP/CPU core 250. Each of the microphone interface peripheral 210 and the DSP/CPU core 250 may be operated according to the methods described herein. For example, the microphone interface peripheral 210 and the DSP/CPU core 250 may perform one or more of the methods shown by way of example in FIG. 4. The microphone interface peripheral 210 may be implemented in an RTL block. The DSP/CPU core 250 may implement firmware, run firmware, or include firmware.

The microphone interface peripheral 210 may include a filter 212, a data store 214, and sound energy detection (SED) logic 216. The filter 212 may be implemented by a decimation filter, which reduces a sample rate of a signal. The filter may be advantageously provided in the microphone interface peripheral to provide power savings, as described herein. The filter may run at a relatively high oversample rate (compared with subsequent filter(s)). The filter may have a multiplier-less structure. The filter may provide relatively high decimation, which produces output at a relatively lower sample rate to simplify or facilitate subsequent processing by the DSP/CPU core 250. In an embodiment, the filter 212 may include a cascaded-integrator comb (CIC) filter. The filter 212 may output at least one sample, also referred to as a "frame."

The data store 214 may store frames output by the filter 212. In an embodiment, the data store 214 may save frames for later distribution to the DSP/CPU core 250. In another embodiment, the data store 214 may pass frames immediately to the DSP/CPU core 250. By way of non-limiting example, the data store 214 may be implemented by or include a storage apparatus for storing data such as in a first-in-first-out (FIFO) manner. The data store 214 may process, store, and output data in a format compatible with the DSP/CPU core 250. For example, if the filter 212 is implemented by a CIC decimator or variant and the DSP/CPU core receives blocks of sample data in a pre-definable format, then the data store may receive the CIC filter output, which output may be generated uniformly over time. The data store may then output data to the DSP/CPU core 250 in bursts as desired by the DSP/CPU core 250.

In an embodiment, where the data store 214 is a queue such as a FIFO, the FIFO depth may be selected such that when the DSP/CPU core 250 wakes up, the queue contains at least one frame of data before a triggering frame, i.e., a frame that triggers a sound detect function, as further described herein. For example, if an audio sample has a frame length of 256, the depth of the FIFO may be 1024 such that three frames and a detected triggering frame would be retained in the queue. Alternatively, the data store 214 may be implemented by any storage apparatus understood by one of ordinary skill in the art.

The SED 216 may be communicatively coupled to an output of the filter 212 and the DSP/CPU core 250. In embodiments, the SED may estimate signal strength of a signal, estimate an amount of noise in a frame, detect a type of frame, and/or output an interrupt signal to wake up the DSP/CPU core 250.

The SED 216 may operate on a configurable number of frame output(s) by the filter 212 to estimate a received signal strength (RSSI). In an embodiment, sound energy is determined based a time domain analysis. The time domain analysis may include determining an energy of a sample by summing values for each frame, e.g., in the form of sum of squares, sum of absolutes, etc. In another embodiment, sound energy is determined based on a frequency domain analysis. The frequency domain analysis may include tuning to a specified frequency and detecting sound activity at that frequency. The SED may output the RSSI to the DSP/CPU core 250. Other signal strength estimation techniques understood by one of ordinary skill in the art may also be used.

The SED 216 may operate on a configurable number of frame output(s) by the filter 212 to estimate a noise strength ("Enoise") in the frame. Enoise may provide information regarding an environment in which the PDM microphone 202 is situated, e.g., in a crowd, in nature, on a street, etc. This allows the PDM microphone to be used as a monitor. In other words, the described apparatus and techniques might apply in "context aware" applications. The SED may output Enoise to the DSP/CPU core 250.

The SED 216 may determine a type of frame, e.g., whether the frame is a sound frame or a noise frame. A sound frame may include sounds directed to the PDM microphone. A noise frame may include ambient noise or background sound. In an embodiment, the SED may determine a frame type based on a comparison of a characteristic of the frame and a threshold value. The threshold may be configured by the DSP/CPU core 250. For instance, a characteristic exceeding a threshold may indicate that a frame is a signal frame such as a sound frame. A characteristic may indicate that the sound is more likely than not a voice sample. As another example, a characteristic being below a threshold may indicate that a frame is a noise frame. A characteristic may indicate a likelihood of the sound being part of background noise. Additionally, signal strength estimation may be performed according to methods and techniques understood by one of ordinary skill in the art.

The SED may transmit an interrupt signal to the DSP/CPU core 250 in response to detected sound energy. In an embodiment, the RSSI may be a basis for outputting the interrupt signal. For example, the interrupt signal may be output if sound energy is detected. As another example, the interrupt signal may be output if a filtered sound sample is above a threshold value. The threshold value may be dynamically updated. For example, the type of sound may be identified and the threshold may be adjusted accordingly.

The DSP/CPU core 250 may be an IP core including any combination of DSPs, CPUs, and logic to implement the methods discussed herein. The DSP/CPU core 250 may include a data store interface 252, a filter 254 and a sensor processing algorithm 256.

The data store interface 252 may be compatible with the data store 214. The interface may process a queue or other storage apparatus to condition an input to the filter 254. The data store interface may be customizable. The data store interface may be instantiated for multiprocessor communication. For example, the DSP/CPU core 250 may be configured to receive data in chunks, while the filter 212 outputs data as a steady stream. The data store 214 may store the output of the filter 212, then output the data to the data store interface 252. The data store interface 252 may then output the data in chunks recognizable by the filter 254.

The filter 254 may process received data including decimation, volume control, and/or offset removal. In an embodiment, the filter 254 includes a filter with multiple stages. In another embodiment, the filter 254 includes at least one filter. The filter 254 may include at least one decimation stage. The decimation stage(s) may be implemented by any combination of finite impulse response (FIR) and half-band filters, or any other combination of filters as understood by one of ordinary skill in the art.

The sensor processing algorithm 256 may include a detection algorithm and/or a trigger algorithm. For example, the sensor processing algorithm may include voice detection and/or voice trigger functions. The sensor processing algorithm may analyze an audio sample to determine corresponding functions. For example, an audio sample may trigger a function.

In an embodiment, the microphone interface peripheral 210 may include a sensor interface (not shown). The sensor interface may be compatible with the microphone 202. The sensor interface may include logic for receiving output for the sensor and outputting the sensor data to the filter 212.

In an embodiment, the DSP/CPU core 250 may include a low-power sound detecting device (LPSD) 258 communicatively coupled to an output of the filter 254 and an input of the sensor processing algorithm 256. The LPSD may process the output of the filter 254 to identify sound activity prior to outputting data to the sensor processing algorithm 256. For example, the LPSD may analyze a received sound sample to determine whether the sound sample represents an activity of interest. As another example, the LPSD may analyze the received sound sample to determine whether the type of sound sample, e.g., nature sound, voice, street noise, etc.

The DSP/CPU core 250 may include at least one general purpose input and/or output (GPIO) port (not shown). The GPIO port(s) may generate a control signal understood by the PDM microphone interface peripheral 210 and SED. The GPIO port(s) may receive SED parameters such as RSSI and Enoise. The architecture described herein enables the DSP/CPU core 250 to use the RSSI and Enoise along with other information such as CIC data, to estimate an SED detection threshold. The parameter may also be used to sense a context, environment, and/or ambience in which the apparatus is used. The sensed context, environment, and/or ambience may be used, e.g., by the DSP/CPU core 250 to set a MCPS vs. audio quality tradeoff.

In operation, the DSP/CPU core 250 may remain in power down mode until alerted by the microphone interface peripheral 210. In an embodiment, the DSP/CPU core 250 may have a firmware-operated power down mode. The DSP/CPU core 250 may remain in a power down mode until alerted by the SED 216.

The SED module in the RTL block allows for the DSP/CPU core 250 to be in a low power mode so that it does not need to process all of the filter data. If the SED 216 determines that the sound sample exceeds a threshold value, the DSP/CPU 250 may then "wake up." For example, the DSP/CPU core 250 may be awakened by the SED module, e.g., via an interrupt signal, if sound energy is detected. After waking up, the DSP/CPU core 250 may access data from FIFO. This allows a user to have full flexibility in firmware to design SED interrupt handling and DSP/CPU power down state machine design and dynamic tuning. For example, data stored in the data store 214 may then be forwarded for processing by the data store interface 252, additional filtering by filter 254, and analysis by sensor processing algorithm 256. The methods discussed herein are also compatible with other types of power-down modes, e.g., a lower-power state, a mode that retains a state may bring further reduction in average power consumed, etc. In an embodiment, prior to sensor processing, the data may be analyzed by a LPSD 258.

In operation, the filter 212 may receive a sample from PDM microphone 202, e.g., an oversampled one-bit data stream. In an embodiment, the sample rate may be progressively reduced by the filter 212 and the filter 254. For example, the filter 212 may be a first stage decimator that reduces the sample rate of the data stream by several orders. By way of non-limiting example, the filter 212 may reduce the sample rate by around 8 times to around 32 times. The first stage decimator may be implemented by a CIC decimator or variant. The filter 212 may remove noise from the data stream and further condition the data stream for subsequent processing by the DSP/CPU core 250. The output of the filter 212 may be stored in data store 214. The output of the filter may be provided to the sound energy detector 216.

Based on the signal output by the filter 212, the SED may estimate, for the signal or a portion thereof, a level of strength and a level of noise. The SED may determine a type of one or more constituent frames of the signal. The SED may make its determination based on a threshold provided by the DSP/CPU core 250. The SED may output the signal strength, noise, and/or type of the signal. The SED may output an interrupt signal to wake up the DSP/CPU core 250, as described herein. The interrupt signal may cause the DSP/CPU core 250 to wake up, as described herein. The DSP/CPU core 250 may remain awake for a pre-determined amount of time.

If the DSP/CPU core 250 is awake, a data stream may be passed from the microphone interface peripheral 210 to the DSP/CPU block 250 via the data store 214 and the data store interface 252. For example, the DSP/CPU core 250 may be configured to receive data in chunks (or bursts), while the filter 212 may output data as a steady stream. The data store 214 may store the output of the filter 212. When desired by the DSP/CPU core 250, the data store 214 may output the data to the data store interface 252. The data store interface 252 may then output bursts of data to the filter 254. Using a FIFO queue as an example, the data store 214 may be configured as follows. The FIFO depth may be selected such that when the DSP/CPU core 250 wakes up, the queue contains at least one frame of data before a triggering frame, i.e., a frame that causes the interrupt signal to be output. For example, if an audio sample has a frame length of 256, the depth of the FIFO may be 1024 such that three frames and a detected triggering frame is retained in the queue.

The filter 254 may include one or more decimation stages to further reduce a sample rate of the data stream. By way of non-limiting example, the filter 254 may reduce the sampling rate by around two times to around eight times. The output of the filter 254 may be a data stream at a sampling rate suitable for the sensor processing algorithm 256, e.g., a Nyquist sampling rate. The sensor processing algorithm may then operate on the data stream to perform processing functions. For example, the sensor processing algorithm may detect an audio stimulus such as a voice command. As another example, the sensor processing algorithm may determine information about an environment in which the audio stream is generated.

FIG. 2B is a simplified block diagram of a system 260 according to an embodiment. The system may include a microphone interface peripheral 270 and a DSP/CPU core 290. Each of the microphone interface peripheral 270 and the DSP/CPU core 290 may be operated according to the methods described herein. For example, the microphone interface peripheral 270 and the DSP/CPU core 290 may perform one or more of the methods shown by way of example in FIG. 4. The microphone interface peripheral 270 may be implemented in an RTL block. The DSP/CPU core 290 may implement firmware, run firmware, or include firmware.

The microphone interface peripheral 270 may include a filter 272, a filter 274, a data store 284, and an SED 276. The filter 272 and/or 274 may be implemented by a decimation filter, which reduces a sample rate of a signal. The filter 272 and/or 274 may be advantageously provided in the microphone interface peripheral to provide power savings, as described herein. The filter 272 and/or 274 may run at a relatively high oversample rate (compared with subsequent filter(s)). The filter 272 and/or 274 may have a multiplier-less structure. The filter 272 and/or 274 may provide relatively high decimation, which produces output at a relatively lower sample rate to simplify or facilitate subsequent processing by the DSP/CPU core 290. In an embodiment, the filter 272 and/or 274 may include a CIC filter or variant. The filter 272 and/or 274 may process received data including decimation, volume control, and/or offset removal. In an embodiment, the filter 272 and/or 274 includes a filter with multiple stages. In another embodiment, the filter 272 and/or 274 includes at least one filter. The filter 272 and/or 274 may include at least one decimation stage. The decimation stage(s) may be implemented by any combination of finite impulse response (FIR) and half-band filters, or any other combination of filters as understood by one of ordinary skill in the art. The filter may output at least one sample, also referred to as a "frame."

The data store 284 may store frames output by the filter 274. In an embodiment, the data store 284 may save frames for later distribution to the DSP/CPU core 290. In another embodiment, the data store 284 may pass frames immediately to the DSP/CPU core 290. By way of non-limiting example, the data store 284 may be implemented by or include a storage apparatus for storing data such as in a first-in-first-out (FIFO) manner. The data store 284 may process, store, and output data in a format compatible with the DSP/CPU core 290. For example, if the filter 272 and/or 274 is implemented by a CIC decimator or variant and the DSP/CPU core receives blocks of sample data in a predefinable format, then the data store may receive the CIC filter output, which output may be generated uniformly over time. The data store may then output data to the DSP/CPU core 290 in bursts as desired by the DSP/CPU core 290.

In an embodiment, where the data store 284 is a queue such as a FIFO, the FIFO depth may be selected such that when the DSP/CPU core 290 wakes up, the queue contains at least one frame of data before a triggering frame, i.e., a frame that triggers a sound detect function, as further described herein. For example, if an audio sample has a frame length of 256, the depth of the FIFO may be 1024 such that three frames and a detected triggering frame would be retained in the queue. Alternatively, the data store 284 may be implemented by any storage apparatus understood by one of ordinary skill in the art.

In an embodiment, the SED 276 may be communicatively coupled to an output of the filter 274 and the DSP/CPU core 250. In an alternative embodiment, the SED 276 may be communicatively coupled to an output of filter 272 and the DSP/CPU core 290. In yet another embodiment, the SED 276 may be communicatively coupled to the filter 272 and the filter 274 and may select between the filter 272 and 274. For example, the selection of filter 272 or 274 may depend on power consumption, processing power, etc. The output of the filter 274 may be provide a cleaner signal to the SED 276.

In embodiments, the SED may estimate signal strength of a signal, estimate an amount of noise in a frame, detect a type of frame, and/or output an interrupt signal to wake up the DSP/CPU core 290. The SED 276 may operate on a configurable number of frame output(s) by the filter 272 and/or 274 to estimate a received signal strength (RSSI). In an embodiment, sound energy is determined based a time domain analysis. The time domain analysis may include determining an energy of a sample by summing values for each frame, e.g., in the form of sum of squares, sum of absolutes, etc. In another embodiment, sound energy is determined based on a frequency domain analysis. The frequency domain analysis may include tuning to a specified frequency and detecting sound activity at that frequency. The SED may output the RSSI to the DSP/CPU core 290. Other signal strength estimation techniques understood by one of ordinary skill in the art may also be used.

The SED 276 may operate on a configurable number of frame output(s) by the filter 272 and/or 274 to estimate a noise strength ("Enoise") in the frame. Enoise may provide information regarding an environment in which the PDM microphone 262 is situated, e.g., in a crowd, in nature, on a street, etc. This allows the PDM microphone to be used as a monitor. In other words, the described apparatus and techniques might apply in "context aware" applications. The SED may output Enoise to the DSP/CPU core 290.

The SED 276 may determine a type of frame, e.g., whether the frame is a sound frame or a noise frame. A sound frame may include sounds directed to the PDM microphone. A noise frame may include ambient noise or background sound. In an embodiment, the SED may determine a frame type based on a comparison of a characteristic of the frame and a threshold value. The threshold may be configured by the DSP/CPU core 290. For instance, a characteristic exceeding a threshold may indicate that a frame is a signal frame such as a sound frame. A characteristic may indicate that the sound is more likely than not a voice sample. As another example, a characteristic being below a threshold may indicate that a frame is a noise frame. A characteristic may indicate a likelihood of the sound being part of background noise. Additionally, signal strength estimation may be performed according to methods and techniques understood by one of ordinary skill in the art.

The SED may transmit an interrupt signal to the DSP/CPU core 290 in response to detected sound energy. In an embodiment, the RSSI may be a basis for outputting the interrupt signal. For example, the interrupt signal may be output if sound energy is detected. As another example, the interrupt signal may be output if a filtered sound sample is above a threshold value. The threshold value may be dynamically updated. For example, the type of sound may be identified and the threshold may be adjusted accordingly.

The DSP/CPU core 290 may be an IP core including any combination of DSPs, CPUs, and logic to implement the methods discussed herein. The DSP/CPU core 290 may include a data store interface 282 and a sensor processing algorithm 286.

The data store interface 282 may be compatible with the data store 284. The interface may process a queue or other storage apparatus to condition an input to the sensor processing algorithm 286. The data store interface may be customizable. The data store interface may be instantiated for multiprocessor communication. For example, the DSP/CPU core 290 may be configured to receive data in chunks, while the filter 274 outputs data as a steady stream. The data store 284 may store the output of the filter 274, then output the data to the data store interface 282. The data store interface 282 may then output the data in chunks recognizable by the sensor processing algorithm 286.

The sensor processing algorithm 286 may include a detection algorithm and/or a trigger algorithm. For example, the sensor processing algorithm may include voice detection and/or voice trigger functions. The sensor processing algorithm may analyze an audio sample to determine corresponding functions. For example, an audio sample may trigger a function.

In an embodiment, the microphone interface peripheral 210 may include as sensor interface (not shown). The sensor interface may be compatible with the sensor microphone 202. The sensor interface may include logic for receiving output for the sensor and outputting the sensor data to the filter 272.

In an embodiment, the DSP/CPU core 290 may include a low-power sound detecting device (LPSD) 288 communicatively coupled to an output of the data store interface 282 and an input of the sensor processing algorithm 286. The LPSD may process the output of the data store interface 282 to identify sound activity prior to outputting data to the sensor processing algorithm 286. For example, the LPSD may analyze a received sound sample to determine whether the sound sample represents an activity of interest. As another example, the LPSD may analyze the received sound sample to determine whether the type of sound sample, e.g., nature sound, voice, street noise, etc.

The DSP/CPU core 290 may include at least one general purpose input and/or output (GPIO) port (not shown). The GPIO port(s) may generate a control signal understood by the PDM microphone interface peripheral 270 and SED. The GPIO port(s) may receive SED parameters such as RSSI and Enoise. The architecture described herein enables the DSP/CPU core 290 to use the RSSI and Enoise along with other information such as CIC data, to estimate an SED detection threshold. The parameter may also be used to sense a context, environment, and/or ambience in which the apparatus is used. The sensed context, environment, and/or ambience may be used, e.g., by the DSP/CPU core 290 to set a MCPS vs. audio quality tradeoff.

In operation, the DSP/CPU core 290 may remain in power down mode until alerted by the microphone interface peripheral 270. In an embodiment, the DSP/CPU core 290 may have a firmware-operated power down mode. The DSP/CPU core 290 may remain in a power down mode until alerted by the SED 276.

The SED module in the RTL block allows for the DSP/CPU core 290 to be in a low power mode so that it does not need to process all of the filter data. If the SED 276 determines that the sound sample exceeds a threshold value, the DSP/CPU 290 may then "wake up." For example, the DSP/CPU core 290 may be awakened by the SED module, e.g., via an interrupt signal, if sound energy is detected. After waking up, the DSP/CPU core 290 may access data from FIFO. This allows a user to have full flexibility in firmware to design SED interrupt handling and DSP/CPU power down state machine design and dynamic tuning. For example, data stored in the data store 284 may then be forwarded for processing by the data store interface 282 and analysis by sensor processing algorithm 286. The methods discussed herein are also compatible with other types of power-down modes, e.g., a low-power state, a mode that retains a state may bring further reduction in average power consumed, etc. In an embodiment, prior to sensor processing, the data may be analyzed by a LPSD 288.

In operation, the filter 272 may receive a sample from PDM microphone 262, e.g., an oversampled one-bit data stream. In an embodiment, the sample rate may be progressively reduced by the filter 272 and the filter 274. For example, the filter 272 may be a first stage decimator that reduces the sample rate of the data stream by several orders. By way of non-limiting example, the filter 272 may reduce the sample rate by around 8 times to around 32 times. The first stage decimator may be implemented by a CIC decimator or variant. The filter 272 may remove noise from the data stream and further condition the data stream for subsequent processing. In an embodiment, the output of the filter 272 may be provided to the filter 274.

The filter 274 may include one or more decimation stages to reduce a sample rate of the data stream. By way of non-limiting example, the filter 274 may reduce the sampling rate by around two times to around eight times. The output of the filter 274 may be a data stream at a sampling rate suitable for the sensor processing algorithm 286, e.g., a Nyquist sampling rate. The output of the filter 274 may be passed to the SED 276. The output of the filter 274 may be stored in data store 284.

In an embodiment, the SED operates on an output of filter 274. In an alternative embodiment, the SED may instead operate on an output of the filter 272. In another embodiment, the SED 276 may select between the outputs of filter 272 and 274. For example, the selection of filter 272 or 274 may depend on power consumption, processing power, etc. The output of the filter 274 may be provide a cleaner signal to the SED 276.

Based on the received signal, the SED may estimate, for the signal or a portion thereof, a level of strength and a level of noise. The SED may determine a type of one or more constituent frames of the signal. The SED may make its determination based on a threshold provided by the DSP/CPU core 290. The SED may output the signal strength, noise, and/or type of the signal. The SED may output an interrupt signal to wake up the DSP/CPU core 290, as described herein. The interrupt signal may cause the DSP/CPU core 290 to wake up, as described herein. The DSP/CPU core 290 may remain awake for a pre-determined amount of time.

If the DSP/CPU core 290 is awake, a data stream may be passed from the microphone interface peripheral 270 to the DSP/CPU block 290 via the data store 284 and the data store interface 282. For example, the DSP/CPU core 290 may be configured to receive data in chunks (or bursts), while the filter 274 may output data as a steady stream. The data store 284 may store the output of the filter 274. When desired by the DSP/CPU core 290, the data store 284 may output the data to the data store interface 282. The data store interface 282 may then output bursts of data to the sensor processing algorithm 286. Using a FIFO queue as an example, the data store 284 may be configured as follows. The FIFO depth may be selected such that when the DSP/CPU core 290 wakes up, the queue contains at least one frame of data before a triggering frame, i.e., a frame that causes the interrupt signal to be output. For example, if an audio sample has a frame length of 256, the depth of the FIFO may be 1024 such that three frames and a detected triggering frame is retained in the queue.

The sensor processing algorithm 286 may operate on the data stream to perform processing functions. For example, the sensor processing algorithm may detect an audio stimulus such as a voice command. As another example, the sensor processing algorithm may determine information about an environment in which the audio stream is generated. The filter 254 may include one or more decimation stages to further reduce a sample rate of the data stream. By way of non-limiting example, the filter 274 may reduce the sampling rate by around two times to around eight times. The output of the filter 274 may be a data stream at a sampling rate suitable for the sensor processing algorithm 286, e.g., a Nyquist sampling rate. The sensor processing algorithm may then operate on the data stream to perform processing functions. For example, the sensor processing algorithm may detect an audio stimulus such as a voice command. As another example, the sensor processing algorithm may determine information about an environment in which the audio stream is generated.

Systems 100, 200, and 260 are examples of partitioning of filters and processing between an RTL block and a firmware block. Each of the RTL blocks and firmware blocks may be customizable. In an embodiment, the components described may be partitioned between the RTL block and the software block in other ways. For example, some or all of the components may be provided in the RTL block. As another example, some or all of the components may be provided in the firmware block.

Figure 3:
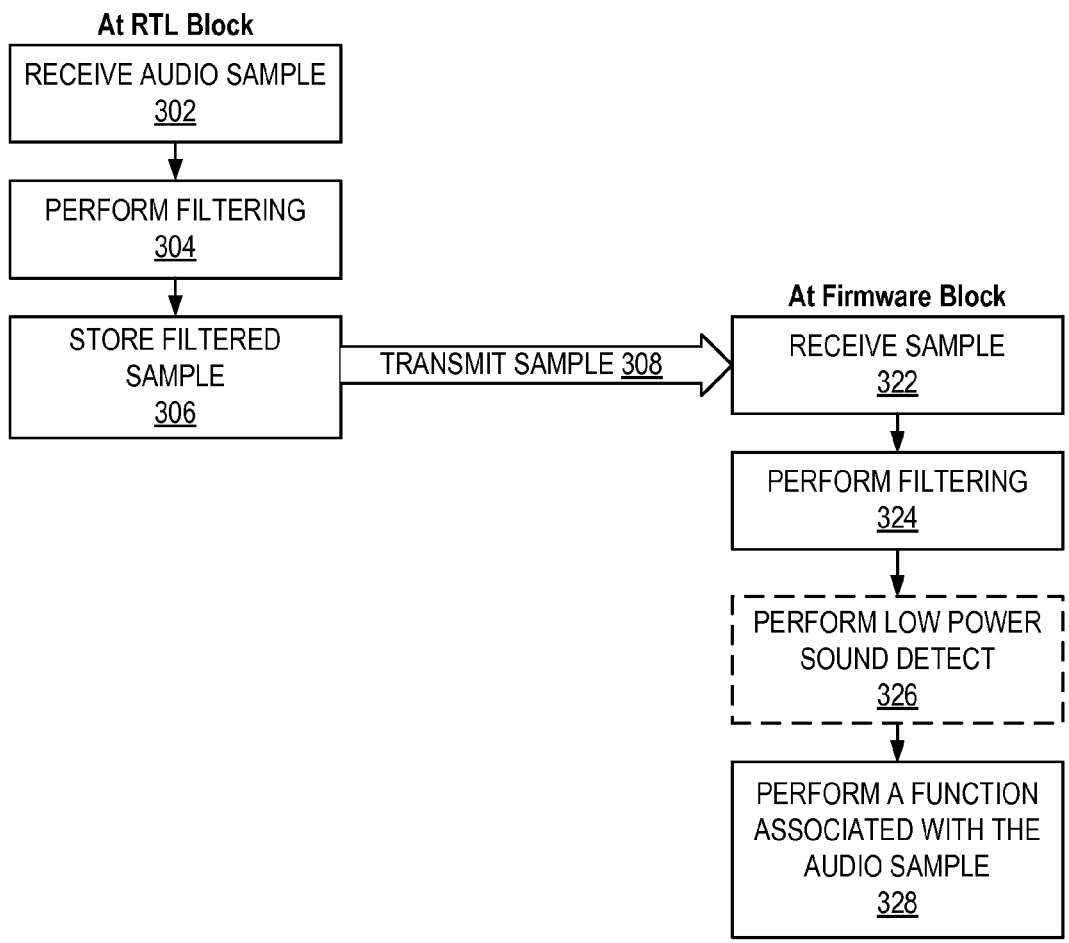
FIG. 3 is a flowchart of a method for processing audio using a partitioned system according to an embodiment.

FIG. 3 is a flowchart of a method 300 for processing audio using a partitioned system. In an embodiment, 302-306 may be performed by an RTL block such as RTL block 110 shown in FIG. 1, and 322-328 may be performed by a processor block such as processor block 150 shown in FIG. 1.

At 302, the method 300 may receive an audio sample at an RTL block. For example, the audio sample may be a signal output by a PDM microphone, i.e., an oversampled one-bit data stream. At 304, the method may filter the received audio sample. In an embodiment, the filtering may reduce a sampling rate of the audio sample. For example, the filtering may be a decimation process that reduces the sample rate of the data stream. The filtering in 304 may include removing noise from the data stream and further conditioning the data stream. At 306, the method 300 may store the filtered samples. For example, the method 300 may store the filtered samples in a particular order, e.g., FIFO. A pre-defined number of samples may be stored at 306. The number of samples stored may correspond to a length of the audio sample. In an embodiment, a most recent pre-defined number of samples may be stored. For example, older samples may be overwritten by more recently-received samples.

At 308, the method 300 may transmit the filtered samples from an RTL block to a firmware block. The transmission may alter a rate or data chunk size of the filtered samples. For example, samples may be transmitted in bursts of a pre-definable size. The samples may then be received by a firmware block (322). The method 300 may filter the received samples (324). For example, the filtering may include one or more decimation stages to further reduce a sample rate of the data stream. The result of the filtering in 324 may be a data stream at a Nyquist sampling rate. The method 300 may then operate on the filtered stream to perform audio processing functions (328). For example, the method 300 may detect an audio stimulus such as a voice command. The method 300 may determine whether the audio stimulus is a trigger for a function. If a voice command is detected, the method 300 may further parse the voice command and perform a corresponding function. As another example, the sensor processing algorithm may determine information about an environment in which the audio stream is generated.

The method 300 may optionally perform low power sound detection (LPSD) (326) subsequent to filtering (324) and prior to performing a function associated with an audio sample (328). The LPSD may include processing a sample to identify sound activity. For example, the LPSD may analyze a received sound sample to determine whether the sound sample represents an activity of interest. As another example, the LPSD may analyze the received sound sample to determine whether the type of sound sample, e.g., nature sound, voice, street noise, etc.

Figure 4:
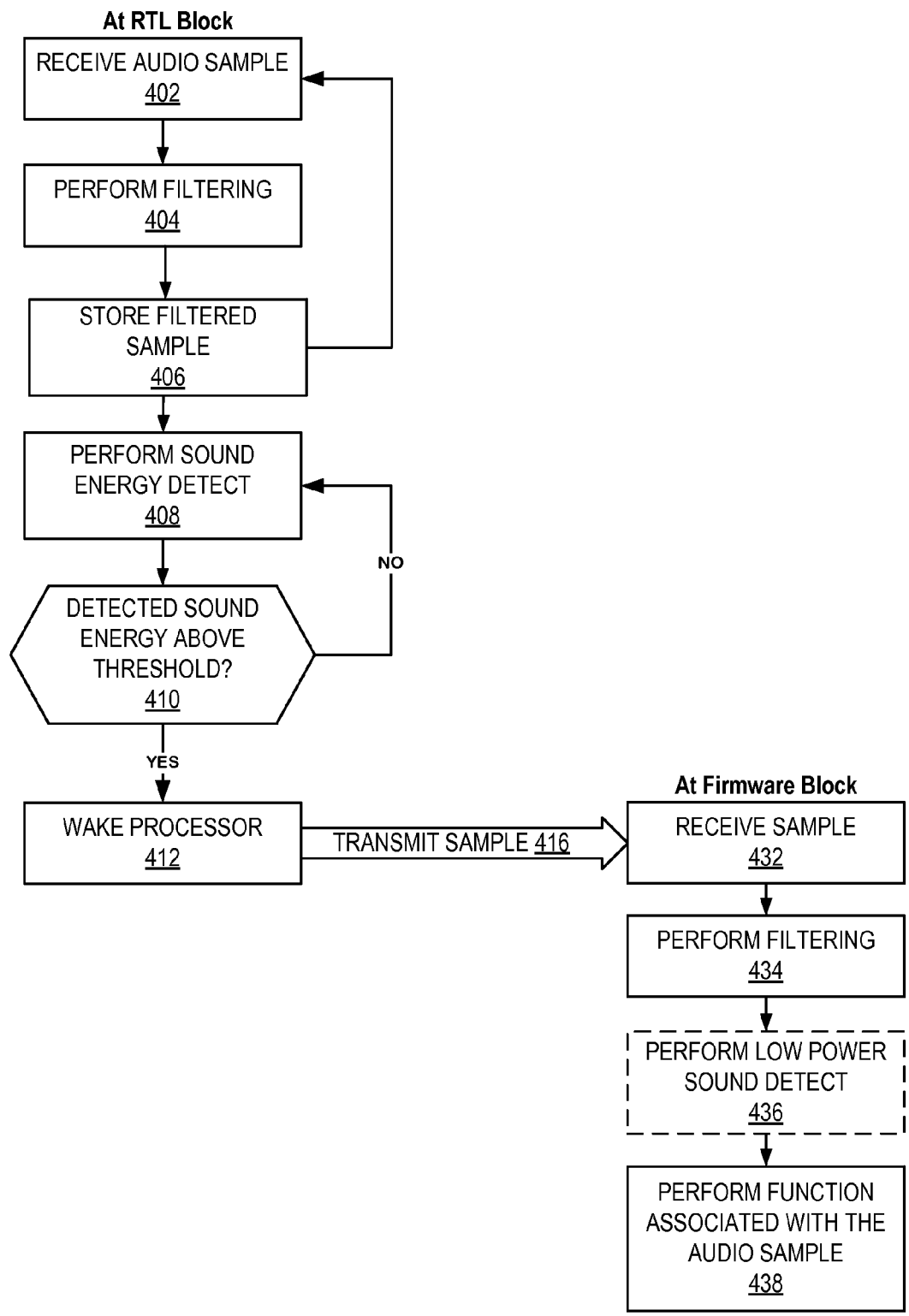
FIG. 4 is a flowchart of a method for processing audio using a partitioned system according to an embodiment.

FIG. 4 is a flowchart of a method 400 for processing audio using a partitioned system. In an embodiment, 402-412 may be performed by an RTL block such that the microphone interface peripheral 210 shown in FIG. 2A or the microphone interface peripheral 270 shown in FIG. 2B, and 432-438 may be performed by a processor block such the DSP/CPU core 250 shown in FIG. 2A or the DSP/CPU core 290 shown in FIG. 2B.

At 402, the method 400 may receive an audio sample at an RTL block. For example, the audio sample may be a signal output by a PDM microphone, e.g., an oversampled one-bit data stream. At 404, the method may filter the received audio sample. In an embodiment, the filtering may reduce a sampling rate of the audio sample. For example, the filtering may be a decimation process that reduces the sample rate of the data stream. The filtering in 404 may include removing noise from the data stream and further conditioning the data stream.

At 406, the method 400 may store the filtered samples. For example, the method 400 may store the filtered samples in a particular order, e.g., FIFO. In an embodiment, the method 400 may continue to receive audio samples while performing other steps. For example, the method 400 may return to 402 to receive another audio sample upon storage of the filtered sample in 406. A pre-defined number of samples may be stored at 406. The number of samples stored may correspond to a length of the audio sample. In an embodiment, a most recent pre-defined number of samples may be stored. For example, older samples may be overwritten by more recently-received samples.

At 408, the method 400 may perform sound energy detection (SED). The detection of sound energy may include estimating signal strength, estimating noise strength in a frame, detecting a type of frame, and outputting an interrupt signal to wake a processor, as described herein.

At 410, the method 400 may determine whether the SED indicates that a characteristic of the frame is above a threshold. If the characteristic does not exceed the threshold, the method 400 may return to 408 to receive another audio sample. If the characteristic is above the threshold, the method 400 may wake the processor (412). For example, the method 400 may transmit an interrupt signal to the processor, as described herein.

At 416, the method 400 may transmit the filtered samples from an RTL block to a firmware block. The transmission may alter a rate or data chunk size of the filtered samples. For example, samples may be transmitted in bursts of a pre-definable size. The samples may then be received by a firmware block (432). At 434, the method 400 may filter the received samples. For example, the filtering may include one or more decimation stages to further reduce a sample rate of the data stream. The result of the filtering in 434 may be a data stream at a Nyquist sampling rate. The method 400 may then operate on the filtered stream to perform audio processing functions (438). For example, the method 400 may detect an audio stimulus such as a voice command. The method 400 may determine whether the audio stimulus is a trigger for a function. If a voice command is detected, the method 400 may further parse the voice command and perform a corresponding function. As another example, the sensor processing algorithm may determine information about an environment in which the audio stream is generated.

In an embodiment, the method may perform low power sound detection (LPSD) 436 after filtering 434 and before audio processing 438. The LPSD may include processing a filtered audio sample to identify sound activity. For example, the LPSD may analyze a received audio sample to determine whether the audio sample represents an activity of interest. As another example, the LPSD may analyze the received sound sample to determine whether the type of sound sample, e.g., nature sound, voice, street noise, etc.

One of ordinary skill in the art would appreciate that error correction and fault tolerance techniques may be applied to the methods described herein. For example, after waking, the DSP/CPU core may return to a power down mode based on inactivity. A pre-definable threshold time range may be maintained and monitored by a timer. If no triggers are received during the threshold time range, the DSP/CPU core may return to the power down mode. Otherwise, the wake time may be extended. A threshold sound energy for triggering the DSP/CPU core may also be set to minimize the instances in which the DSP/CPU core is awakened by a false alarm.

In one aspect, the apparatus and techniques described herein can be used to permit response only to certain types of sounds, or viewed another way, to prevent response to certain types of sounds. For example, a distinguishable audio pattern, such as speech, music, or specific artificially generated noises (e.g. a vehicle horn, a whistle, or a bell, among other audio stimuli) may trigger a response, whereas less distinguishable audio patterns, such as crowd noise, street noise, or "white" noise, may not trigger a response. In this sense, the described apparatus and techniques might apply in "context aware" applications. For instance, the power-down mode and/or threshold for awaking the firmware block may be context-aware. The system may be configured to enter a power-down mode based on characteristics of the environment.

The systems and methods described herein have several advantages over existing systems and methods. With respect to power consumption, the systems and methods described herein may reduce average power consumption, reduce decimation power consumption, and may use a relatively small amount of additional silicon area to realize power savings. That is, the embodiments described herein have low power consumption and low silicon area and high performance.

In embodiments without an SED, the power savings may be substantial compared with typical applications. For instance, systems designed for only firmware voice detection, i.e., without an RTL block, or systems designed for PDM to pulse code modulation (PCM) conversion may realize power savings compared with typical methods.

Further power savings are possible in embodiments including an SED. In one aspect, the modules in the RTL block that are "always-on" such as a CIC filter and SED consume relatively little power. The RTL block architecture and methods of operation described herein also provide power savings by allowing the DSP/CPU core to remain in power down mode for a relatively substantial percentage of time.

In yet another aspect, hierarchical power management may be enabled by providing the SED in the RTL block. For example, by providing the SED in the RTL block, there is provided a first level of data gating of the PDM data to the DSP/CPU core. In an embodiment, the data may be further gated by performing voice detection in firmware before passing the data to a voice trigger algorithm. This may further reduce average power consumption. In another aspect, the partitioning of decimation filter(s) between the RTL and firmware block may reduce decimation power.

In a further aspect, only a small amount of additional silicon area may be used for the PDM interface peripheral and SED. One of ordinary skill in the art would appreciate that the silicon area consumed for the PDM peripheral and SED may be further reduced over time due to reduction in size of transistors and other developments in the art.

With respect to system complexity, the systems and methods described herein may be simplified compared with typical systems and methods. For example, unlike traditional microphones, the PDM microphone may be implemented without an analog to digital converter (ADC). However, typical DSPs are not designed to effectively interface with high rate single-bit data streams like data output by PDM microphones. In one embodiment, the processing of the PDM microphone may be implemented by a simple connection between the PDM peripheral and a processor such as DSP/CPU core via a data store and a data store interface. The simple connection provides a seamless interface between the PDM peripheral and the DSP/CPU core. These simplifications reduce power and area overheads. Unlike in typical systems, an application processor need not move a PDM microphone output into a DSP/CPU memory for "always-on" applications.

The systems and methods described herein are also flexible and dynamically configurable. In one aspect, the PDM peripheral with SED may generate RSSI and Enoise information. The RSSI and Enoise data may be used by the DSP/CPU core to provide a dynamically configurable detection threshold. This may give a user flexibility to design methods to set the detection threshold. In another aspect, the RTL block and the firmware block may be programmable and dynamically configurable. The programming and configuration may be performed on the fly, e.g., to match a user's needs. For example, various filters may be provided in the system, and, in a noisy environment, a filter of a suitable quality may be used for filtering signals from the noisy environment. Filter may be activated and/or used based on an expected environment.

The firmware may provide programmability to support digital PDM microphones with different specifications. For instance, the PDM firmware library may contain modules of various types from which to build a PDM microphone system or to integrate a PDM microphone into a system. The firmware may also provide a framework for dynamic configuration. The tradeoff may be set based on an application scenario.

The architectures described herein have a wide variety of applications. In one aspect, the architectures are compatible with various types of power-down modes, e.g., power shut-off mode. The type of power-down mode used may further reduce an average power consumed by the system. The architectures are compatible with a wide variety of DSPs or CPUs. For example, a system may include a smaller DSP/CPU core to save power and/or use less area. The architectures may include a DSP/CPU with other integrated cores to provide other processing functions. For example, the DSP/CPU may be shared with another application such as audio playback. This may further reduce the architecture footprint.

While the description here pertains to a voice-triggered power up mode of operation, the described concepts apply as well to other "always-on" applications, or "context aware" applications, which can benefit from a power down mode, and which can be awakened by other received sensor data, such as vibration, light or other physical phenomena. For example, other "always-on" or "context aware" applications include sensor fusion applications and "always-on" IoT applications.

Figure 5:
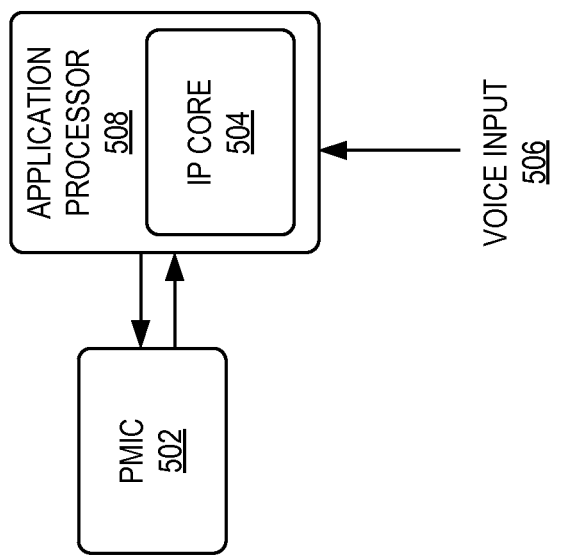
FIG. 5 is a simplified block diagram of a system including an IP core according to an embodiment.

FIG. 5 is a simplified block diagram of a system 500 implementing the methods and systems described herein. The system 500 may include an application processor 508 and a power management integrated circuit (PMIC) 502. The application processor 508 and the PMIC 502 may be communicatively coupled. The application processor 508 may include a IP core 504. The IP core may be implemented according to the methods and systems described herein. For example, the IP core may be implemented according to the firmware block 150. As another example, the IP core may be implemented according to the DSP/CPU core 250. As another example, the IP core may be implemented according to firmware running on DSP/CPU core. In an embodiment, the IP core 504 is configured to perform the methods described herein. In operation, the IP core 504 may receive a sound input 506. The IP core 504 may recognize a trigger, and, responsive to the trigger, signal the PMIC to power on a host CPU. As discussed herein, the IP core 504 may be integrated with other cores to provide other audio processing functionalities.

Figure 6:
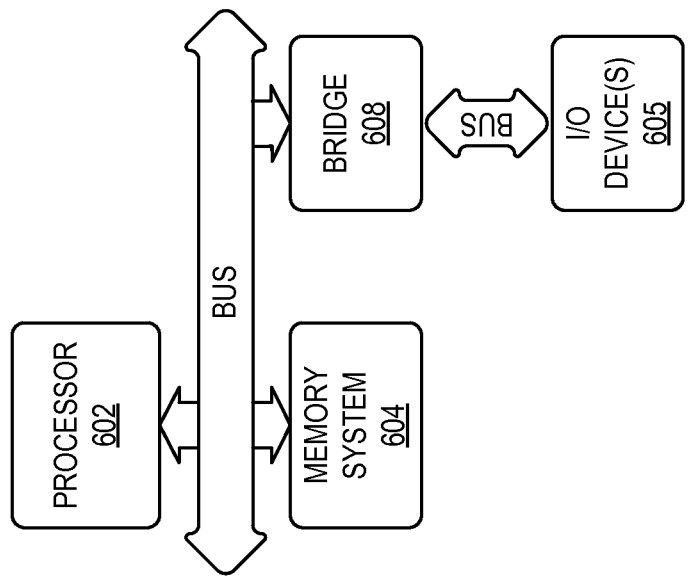
FIG. 6 is a simplified block diagram of a device according to an embodiment.

FIG. 6 is a simplified block diagram of a device 600 implementing the methods and systems described herein. As shown in FIG. 6, the client 600 may include a processor 602, a memory system 604, and at least one input/output (I/O) device 605. The processor may be implemented according to the methods and systems described herein. For example, the processor may be implemented according to the firmware block 150. As another example, the processor may be implemented according to the DSP/CPU core 250.

The processor 602, memory system 604, and I/O device(s) 605 may be communicatively coupled to each other. The communication may be implemented in a variety of ways, e.g., via at least one computer bus and/or bridge device 608. The I/O device(s) 605 may include network adapters and/or mass storage devices from which the device 600 may receive commands for executing the methods described herein. The I/O device(s) 605 may be implemented according to the methods and systems described herein. For example, the I/O device(s) may be implemented by the sensor 102. As another example, the I/O device(s) may be implemented by the PDM microphone 202. The bridge 608 may be implemented according to the methods and systems described herein. For example, the bridge may be implemented according to the RTL block 110. As another example, the bridge may be implemented according to the microphone interface peripheral 210.

Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As used in the appended claims, the term "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments which may operate in accordance with one or more particular standards and protocols. However, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that embody IP cores. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the invention.

What is claimed is:

1. A system to process a sound sample, the system comprising:
    a register transfer level (RTL) block, including:
        a first filter to filter the sound sample; and
    a firmware block, including:
        a processor to parse the stored filtered sound sample and perform a function corresponding to the parsed sound sample; and
    a second filter to receive and filter the stored filtered sound sample.

2. The system of claim 1, wherein the firmware block includes the second filter.

3. A system of claim 1, wherein the RTL block includes the second filter.

4. The system of claim 1, further comprising a sound energy detecting device communicatively coupled to the firmware block and at least one of the first filter and the second filter, to wake the processor responsive to a determination that a characteristic of the filtered sound sample is above a threshold.

5. The system of claim 4, wherein the characteristic is at least one of: a signal strength, a noise strength, a strength of a combination of signal and noise signal.

6. The system of claim 4, wherein the threshold is determined by at least one of: the processor and the RTL block.

7. The system of claim 6, wherein the threshold is determined by the processor.

8. The system of claim 4, wherein the sound energy detecting device wakes the processor such that the system monitors an environment of the sound sample.

9. The system of claim 1, further comprising:
an interface to output the stored sound sample in predefined bursts to at least one of the second filter and the processor; and
a storage apparatus to store the filtered sound sample, wherein the storage apparatus processes in a first-in-first-out (FIFO) order.

10. The system of claim 1, wherein the first filter includes a cascaded integrator-comb (CIC) decimator to decrease the sample rate of the sound sample.

11. The system of claim 1, wherein the second filter includes at least one of: a half-band filter and a finite impulse response (FIR) filter, to decrease the sample rate of the stored sound sample.

12. The system of claim 1, wherein the firmware block implements a power-down mode that wakes in response to an output by the RTL block.

13. The system of claim 1, further comprising a low-power sound detecting device (LPSD) communicatively coupled to the second filter and the processor to classify the sound sample filtered by the second filter and to output the classification to the processor.

14. The system of claim 1, wherein the RTL block and the firmware block operate on an output of a pulse density modulation (PDM) microphone.

15. A computer-implemented method to process a sound sample using a partitioned register transfer level (RTL) block and firmware block, the method comprising:
filtering, by the RTL block, the sound sample;
waking, by the RTL block, the firmware block responsive to a characteristic of the filtered sound sample;
filtering, by the firmware block, the filtered sound sample;
parsing, by the firmware block, the sound sample filtered by the firmware block; and
performing, by the firmware block, a function corresponding to the parsed sound sample.

16. The method of claim 15, wherein the waking comprises waking the firmware block from a power-down mode.

17. The method of claim 15, wherein the filtering by the RTL block includes a first decimation and the filtering by the firmware block includes a second decimation.

18. The method of claim 15, further comprising:
measuring at least one of: a signal strength and a noise strength of the filtered sound sample; and
determining, by the RTL block, the characteristic of the filtered sound sample based on the measuring; and
wherein the waking is performed responsive to a determination that the characteristic of the filtered sound sample is above a threshold.

19. The method of claim 15, wherein the firmware block enters a power-down mode responsive to a determination that at least one of: a signal strength and a noise strength of the filtered sound sample is below the threshold during a predefined time period.

20. The method of claim 15, wherein the threshold is determined by the firmware block.

21. The method of claim 15, further comprising, prior to the parsing, classifying the sound sample filtered by the firmware block; and
wherein the parsing is based on the classifying.

22. A non-transitory computer-readable medium storing program instructions that, when executed, cause an RTL block and a firmware block to perform a method to process audio, the method comprising:
filtering, by the RTL block, the sound sample;
waking, by the RTL block, the firmware block responsive a characteristic of the filtered sound sample;
filtering, by the firmware block, the filtered sound sample;
parsing, by the firmware block, the sound sample filtered by the firmware block; and
performing, by the firmware block, a function corresponding to the parsed sound sample.

23. The non-transitory computer-readable medium of claim 22, further comprising:
measuring, by the RTL block, at least one of: a signal strength and a noise strength of the filtered sound sample; and
determining, by the RTL block, the characteristic of the filtered sound sample based on the measuring; and
wherein the waking is performed responsive to a determination that the characteristic of the filtered sound sample is above a threshold.

24. The non-transitory computer-readable medium of claim 22, wherein the waking comprises waking the firmware block from a power-down mode.

25. The non-transitory computer-readable medium of claim 22, wherein at least one of the RTL block and the firmware block is dynamically configurable.

* * * * *